J. L. FLORIN.
WEEDER.
APPLICATION FILED SEPT. 23, 1918.
1,293,745.
Patented Feb. 11, 1919.
3 SHEETS—SHEET 3.
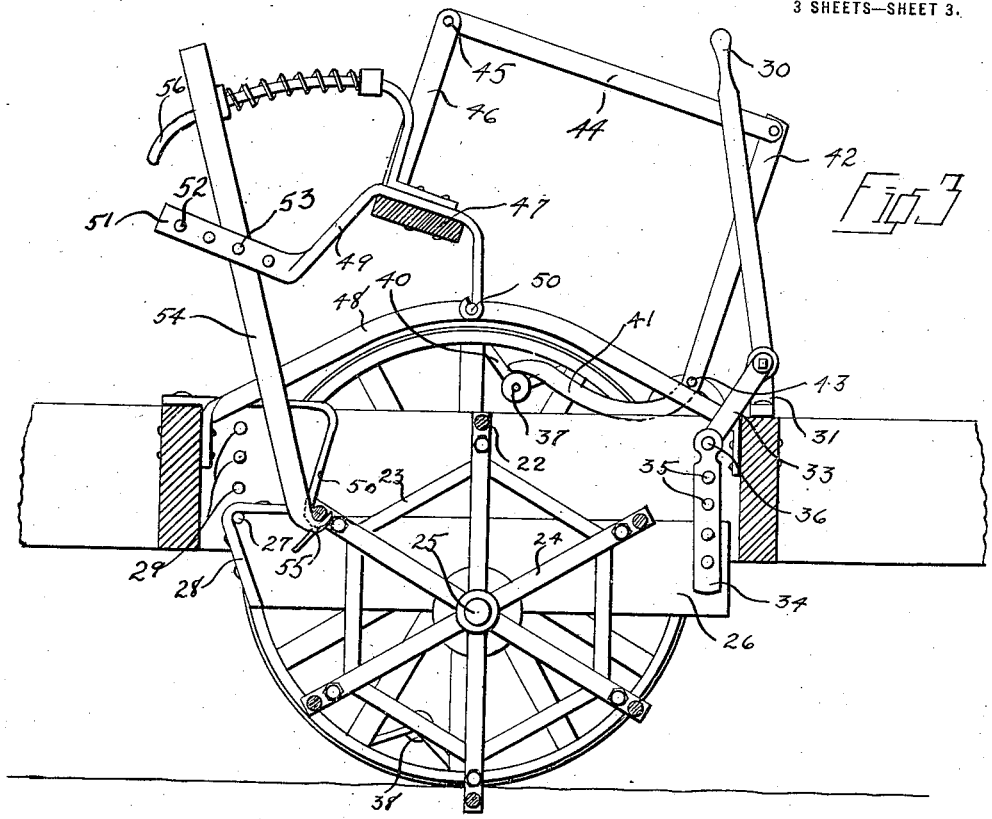
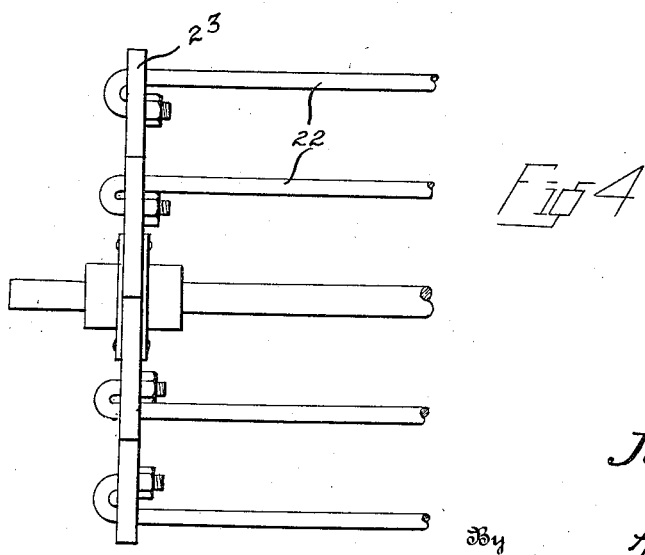
Inventor
John L. Florin
By Herbert E. Smith
Attorney

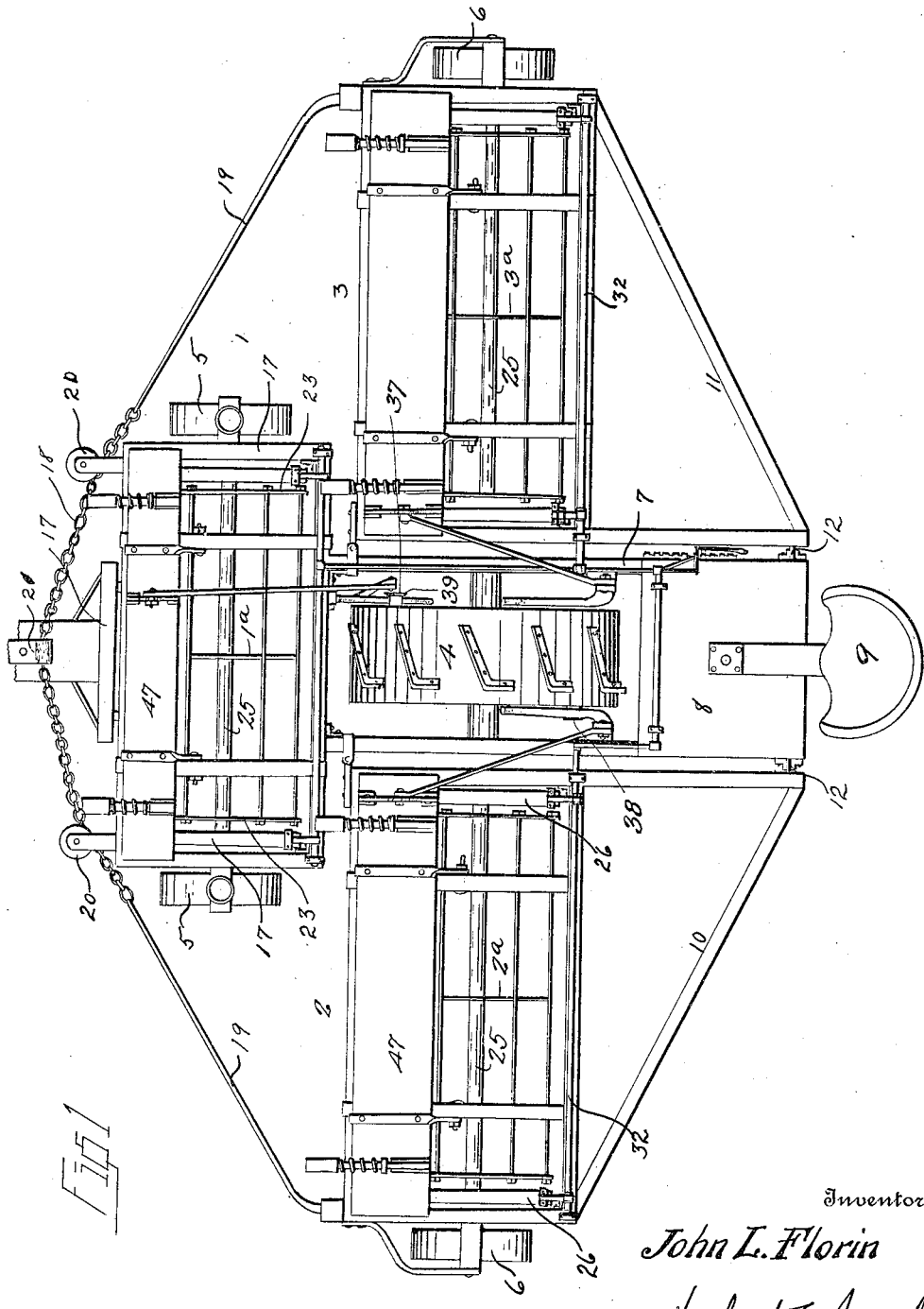

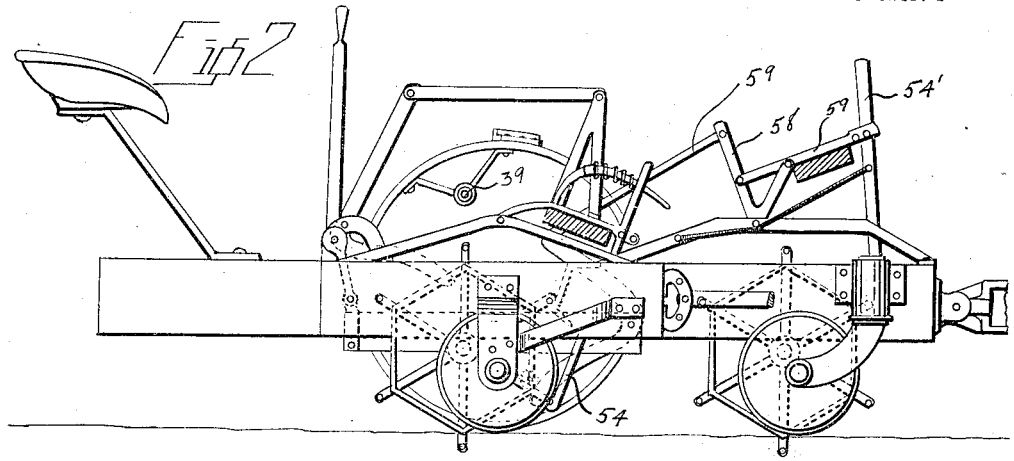
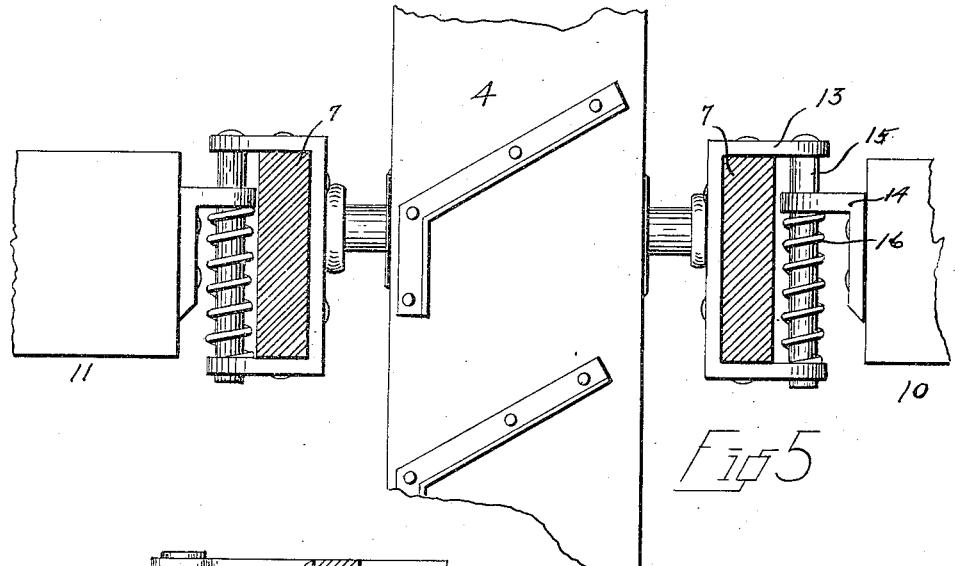
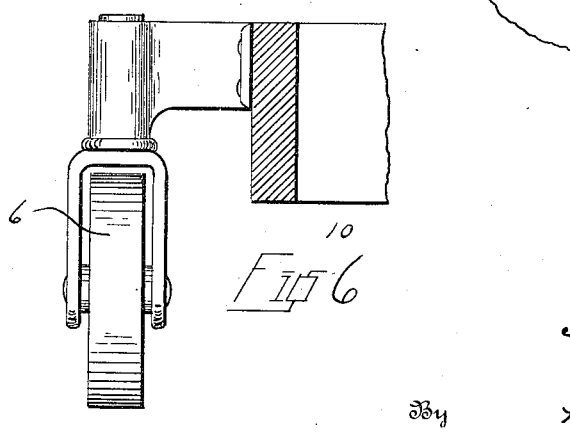

UNITED STATES PATENT OFFICE.

JOHN L. FLORIN, OF DAVENPORT, WASHINGTON.

WEEDER.

1,293,745.   Specification of Letters Patent.   Patented Feb. 11, 1919.

Application filed September 23, 1918. Serial No. 255,238.

*To all whom it may concern:*

Be it known that I, JOHN L. FLORIN, a citizen of the United States, residing at Davenport, in the county of Lincoln and State of Washington, have invented certain new and useful Improvements in Weeders, of which the following is a specification.

The present invention relates to an improved weeder, or agricultural implement designed especially for pulling weeds from fallow ground, and the device also performs the function of a cultivator in that it loosens the top surface of the fallow ground and by permitting the loosened soil to fall back into place again helps to maintain the moisture in the ground by forming a seal to prevent its evaporation therefrom.

The implement is preferably built up in units or sections and each section is composed of a revoluble reel whose transversely arranged bars are designed to be drawn through the fallow ground, beneath the surface, for pulling the weeds, and the reels are automatically revolved at intervals in order that one weeding rod may be withdrawn so that the weeds, grass and roots may fall therefrom and this rod be succeeded by a clean one which takes its place and performs its same functions.

The invention consists in certain novel combinations and arrangements of parts whereby the reels are automatically moved at intervals, and in certain other details of construction as hereinafter pointed out and claimed.

In the accompanying drawings one complete example of the physical embodiment of the invention is illustrated, constructed and arranged according to the best mode so far devised for the practical application of the principles of the invention, and this implement has been highly successful and satisfactory in performing the functions for which it is intended.

In the drawings:

Figure 1 is a top plan view of an implement embodying the novelties of the present invention.

Fig. 2 is a side elevation of the implement, but with the front toward the right in contradistinction to the position of the implement in Fig. 1.

Fig. 3 is an enlarged, detail view, partly in section, showing one of the reels with its weeding rods, and the cam actuated mechanism for intermittently and automatically actuating the reel to present a new and clean weeding rod for its work.

Fig. 4 is a plan view at one end of one of the reels.

Fig. 5 is a detail sectional view showing the resilient connection between the main, intermediate frame and the lateral frames of the implement.

Fig. 6 is a detail showing one of the ground wheels or caster wheels for supporting the implement in connection with the central or "bull" wheels.

In the preferred embodiment of the invention as illustrated in the drawings the implement is made up of three sections or units indicated, each as a whole by the numerals 1, 2 and 3, the central forward section 1 being followed by the two alined sections 2 and 3, and the implement is supported through the instrumentality of the central, large "bull wheel" or traction wheel 4, and the two pairs of ground or caster wheels 5, 5 and 6, 6.

The large central wheel 4 is journaled in the main frame 7, and at the rear the frame is provided with a platform 8 and seat 9 for the driver, while a pair of side frames 10 and 11 are projected laterally from the center or main frame. These two side frames are flexibly connected with the main frame to allow for irregularities in the surface traveled over, and at the rear the frames are hinged as at 12, 12, while at the front a cushioned joint is used as seen in Fig. 5. Here the main frame is provided with a pair of clevises 13, 13, one at each side of the main wheel, and by means of the angle bracket 14 on the side frames and the post 15 and spring 16 beneath the bracket and coiled around the post, a cushioned, flexible connection is provided between the side frames and the main frame, it being readily seen that perforated bracket can ride up and down on the post, against the tension of the spring, and thus take up the movement between the center and side frames. The side frames at their inner ends at the center of the implement are thus hinged and supported from the main frame, and at their outer ends the side frames are supported on the ground wheels 6, 6.

The front unit 1 has its frame 17 rigid with the main frame and forms an extension thereof, and the horse power, or motor power, is applied to the different frames in order to distribute the draft strains, through the draft chain 18, the two draft rods 19, 19 guided on the idler pulleys 20, and the draw bar 21 of usual type. The draft rods are connected to the side frames and the chain through the pulleys and draw pulls on the center or main frame, thus equally distributing the pull over five points and equalizing the strain.

Each unit 1, 2, 3, is equipped with and includes a reel, as 1ª, 2ª, 3ª, and inasmuch as the reels and their operating mechanism are the same, a description of one will suffice for all. In Fig. 4 it will be seen that the reels are made up of a series of metal bars or rods 22 which extend transversely of the implement between the two hexagonal heads 23, 23, and the rods are connected with these heads through the radiating spokes 24. Each reel has a central shaft 25 that has its ends journaled in the end boards 26, 26, extending longitudinally of the machine, with their fronts supported on a pivot bolt as 27 in the supporting frame for the reel. Thus each end board has an angle iron 28 in the form of a bracket through which the pivot bolt 27 is passed and upon which the end boards and reel may be swung in order to lift the reels to inoperative position. The altitude of the reel supports may be varied by utilizing the different sockets 29 provided for the bolts 27 in the reel supporting frames, and the reel may be lifted to inoperative position through the instrumentality of the hand lever 30, pivoted in a bracket at 31 on the supporting frame. This lever is connected with the end boards of the reels by means of the crank shaft 32 in the brackets 31, and the crank arms 33 that are connected, pivotally, to the suspending links 34 fixed to the end boards by bolts passed through the holes 35 in these links. The pivot bolt 36 for the crank arm and link may be utilized in one of several of these holes, or the bolts 34 may be thus used, to adjust the connection, and it will readily be seen that the reel and its supporting end boards may be bodily lifted and swung on the pivot 27 to raise the reel from operative position when so required.

At predetermined intervals each reel is turned one-sixth of a revolution, and this movement is accomplished through the utilization of the cam wheels 37, 38, one on each side of the main wheel, journaled in brackets 40 near the inner periphery of the wheel rim, but slightly beyond the edges of the wheel so that the short arms 41 of the cam levers 42 may project below the top of the wheel in the path of movement of the rollers. These levers are pivoted at 43 in a suitable frame and they form part of an automatically operated frame including a pair of longitudinally disposed links 44 that are pivoted at 45 to the fixed arm 46 that is bolted to the transversely arranged base board 47 of the cam mechanism. This board extends transversely of the implement parallel with the reel, above, and slightly in advance of the center or axis of the reel, and the base board is supported from a frame as 48 through the instrumentality of a pair of pivoted arms 49 to which the board is firmly attached, and these arms, which are located near the ends of the base board, are pivoted at 50 on the frame or support 48, which of course is fixed and stationary. The pivoted arms are bent to required shape, and their free ends 51 are perforated at 52, to receive the bolt 53, by means of which the latch bar 54 is pivoted on the pivoted arm. This latch bar, at its lower end has a hook 55 to engage under one of the weeding rods, at the proper time, and when the bar is lifted it revolves the reel one-sixth of a revolution. At its upper end the latch bar is slotted to pass over the guide bar 56 which is curved to conform to the swinging movement of the latch bar, and the spring 57 on this guide bar acts as a cushion and also tends to hold the latch with its hook up under the transverse weeding bar. The guide bar is fixed on the base board 47.

In Fig. 3 the typical cam operated frame is shown for the rear reels, and the front reel is operated in practically the same manner, except that a bell crank lever 58 is used in connection with a link 59 for connection to the latch bar 54'.

The cam operation will be readily understood, and as the three cam wheels are distributed about the periphery of the large wheel, the actions of the three reels are successive. Thus, in Fig. 3 the large wheel is turning anti-clockwise and the implement is traveling to the left so that the cam wheel 37 has ridden up over the under-edge of the cam lever and turned the reel one-sixth of a revolution, and the lowermost rod is being dragged through the soil just beneath the surface thereof while the hook 50ª is holding the reel, through the foremost weeding rod, in stationary position. When the cam wheel releases the cam lever, the cam operated frame causes the latch to swing downwardly to position to hook the next rod, as at 54ª in Fig. 2, while the forward reel has just been revolved by the latch bar 54'. The altitude of the reels may be adjusted, of course by means of the elevating lever 30 of each unit.

Claims:

1. The combination in an implement as described, with a main frame and supporting wheel therefor and a front extension for the frame, and side frames having supporting wheels at their ends and flexibly connected at their inner ends to the main frame, of adjustable weeding devices carried in the extension and side frames, and means for adjusting the altitude of these devices.

2. The combination with a main frame and large supporting wheel therefor, a front extension rigid with the frame, and a pair of side frames hinged at their inner ends to the main frame and supporting wheels at the free ends of the side frames, of reels comprising weeding bars supported in the extension and side frames, and means for revolving said reels, for the purpose described.

3. The combination with one of the supporting wheels and a cam wheel carried thereby, of the frame, a reel frame pivoted therein and a reel journaled in the pivoted frame and including transverse weeding bars, means for elevating and holding the pivoted frame, and cam lever mechanism for changing the position of the reel as described.

4. The combination with one of the supporting wheels and a cam wheel carried thereby, of the frame, a reel frame pivoted therein and a reel pivoted in the reel frame, said reel comprising end heads and connecting rods, and cam mechanism actuated from the cam wheel for moving said reel on its pivot to bring successive rods into working position.

5. The combination with one of the supporting wheels and a cam wheel carried thereby, of a frame, end boards vertically adjustable in the frame and a shaft supported in the boards, a reel on the shaft having a plurality of circumferentially spaced weeding rods, cam mechanism supported on the frame and a latch bar actuated thereby to turn the reel, and said mechanism including a cam lever co-acting with the cam wheel.

In testimony whereof I affix my signature.

JOHN L. FLORIN.